United States Patent
Ashikawa (10) Patent No.: US 7,574,152 B2
(45) Date of Patent: Aug. 11, 2009

(54) AC HIGH-VOLTAGE DEVICE, IMAGE FORMING APPARATUS, AND AC HIGH-VOLTAGE OUTPUT CONTROLLING METHOD WHICH RESTARTS THE AC HIGH-VOLTAGE AFTER AN OVERLOAD

(75) Inventor: Yoshihisa Ashikawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 231 days.

(21) Appl. No.: 11/553,691

(22) Filed: Oct. 27, 2006

(65) Prior Publication Data

US 2007/0098419 A1    May 3, 2007

(30) Foreign Application Priority Data

Oct. 31, 2005    (JP)    ............... 2005-316242

(51) Int. Cl.
     *G03G 15/00* (2006.01)
(52) U.S. Cl. .......................................... 399/37; 399/88
(58) Field of Classification Search ................ 399/37, 399/315, 33, 88
See application file for complete search history.

(56) References Cited

U.S. PATENT DOCUMENTS

| 4,341,457 | A | * | 7/1982 | Nakahata et al. ............ 399/314 |
| 4,520,437 | A | | 5/1985 | Boettcher, Jr. et al. |
| 4,713,740 | A | | 12/1987 | Drabing |
| 6,829,444 | B2 | | 12/2004 | Ashikawa |
| 2001/0015578 | A1 | * | 8/2001 | Westlake ..................... 307/125 |
| 2001/0043091 | A1 | | 11/2001 | Hall et al. |
| 2004/0032754 | A1 | | 2/2004 | Yang |

FOREIGN PATENT DOCUMENTS

| JP | 8-101589 | 4/1996 |
| JP | 10-318157 | 12/1998 |
| JP | 2000-295839 | 10/2000 |
| JP | 3167092 | 3/2001 |

\* cited by examiner

*Primary Examiner*—Quana M Grainger
(74) *Attorney, Agent, or Firm*—Oblon, Spivak, McClelland, Maier & Neustadt, P.C.

(57) ABSTRACT

An AC high-voltage device includes a voltage controlling unit that controls an AC transforming unit. The AC transforming unit transforms supplied power to an AC high voltage. The voltage controlling unit includes a constant-voltage controlling unit and an turn-off unit. The constant-voltage controlling unit controls the AC transforming unit when an overcurrent does not occur in the AC high voltage. The turn-off unit turns off the AC transforming unit during a period in which an over-correct occurs. The constant-voltage controlling unit re-starts the AC transforming unit after the period.

5 Claims, 8 Drawing Sheets

AC HIGH-VOLTAGE DEVICE, IMAGE FORMING APPARATUS, AND AC HIGH-VOLTAGE OUTPUT CONTROLLING METHOD WHICH RESTARTS THE AC HIGH-VOLTAGE AFTER AN OVERLOAD

CROSS-REFERENCE TO RELATED APPLICATIONS

The present document incorporates by reference the entire contents of Japanese priority document, 2005-316242 filed in Japan on Oct. 31, 2005.

BACKGROUND OF THE INVENTION

1. Field of the Invention

The present invention generally relates to an alternating-current (AC) high-voltage device that outputs an AC high-voltage, and specifically relates to an AC high-voltage device that outputs a constant AC high-voltage.

2. Description of the Related Art

As disclosed in Japanese Patent No. 3167092 and Japanese Patent Application Laid-open No. H8-101589, an electrophotographic image forming apparatus such as a printer, copier, facsimile, or Multifunction Product (MFP), forms a toner image on an image carrier and transfers the toner image onto such an image medium as a transfer sheet applying a charge bias scheme. When transferring though this scheme, the image media are attracted to each other after transfer by electrostatic-force. To avoid this problem, a scheme is used for separating these image carriers by eliminating static charge through AC high-voltage discharge.

Particularly in so-called tandem color image formation, an attachment force is strong between the transfer sheet and an intermediate transfer belt after an image-transfer, where images generated on photosensitive members for respective colors are combined to form a color image in the course of transfer onto an intermediate transfer belt and then the image is transferred from the intermediate transfer belt to a transfer sheet. Therefore, it is indispensable to ensure sheet separation by applying an AC high-voltage output to a static charge eliminator for discharge onto a paper sheet subjected to paper transfer, which is shown in Japanese Patent Application Laid-open No. H8-101589.

In this case, an AC high-voltage output applied to the static charge eliminator has a large-power peak-to-peak (hereinafter, "Pk-Pk") voltage of approximately 8.0 kilovolts to 12.0 kilovolts. Therefore, to ensure safety, a unit is provided that detects an over-current in AC high-voltage output to an AC high-voltage generating unit, making it possible to avoid a failure due to over-current.

It is assumed herein that an over-current is detected in AC high-voltage output on condition that a value approximately double a specification range of an output current in AC high-voltage output is detected successively for approximately 200 milliseconds to 300 milliseconds. If the detection condition is satisfied, the AC high-voltage output is forcefully turned OFF by an AC high-voltage unit. Information indicative of an abnormality is fed back to a main controlling unit of the image forming apparatus, causing a signal of a return-to-normal-state be issued as a serviceperson call (SC) from the image forming apparatus.

Figure 9:
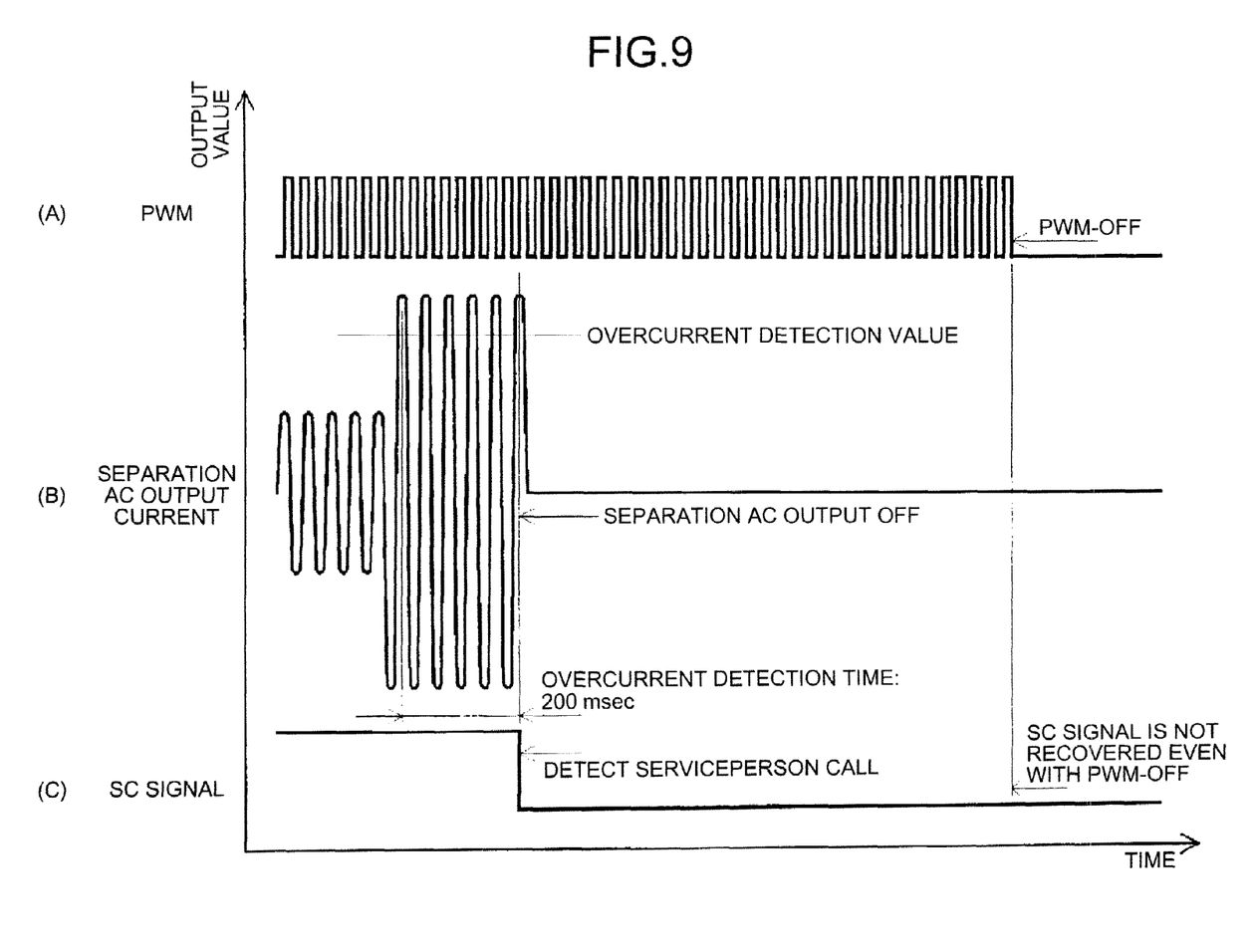
FIG. 9 is a signal line diagram for explaining a related art of an AC high-voltage generating unit.

FIG. 9 is a signal line diagram for explaining a related art of an AC high-voltage generating unit. In this drawing, the vertical axis represents an output value, and the horizontal axis represents time, and depicted is a relation among three signals on the same time axis, that is, (A) a pulse-width modulation (PWM) signal, (B) an output current of an AC high-voltage output, and (C) an SC signal.

The AC high-voltage generating unit, which generates an AC high-voltage output to supply the static charge eliminator, controls voltage to be constant for a transformer by a target Pk-Pk value indicated by the PWM signal from a main controlling unit of the image forming apparatus, thereby transforming supplied power to an AC high-voltage output. An over-current in an output current of the AC high-voltage output which is detected as a value approximately double the specification range of an output current detected successively for approximately 200 milliseconds to 300 milliseconds. Therefore, a current exceeding an over-current detection value flows, as shown in FIG. 9, if only continued for 200 milliseconds to 300 milliseconds output, and then the AC high-voltage output is turned OFF.

When turning the output OFF, an SC signal indicative of an abnormality is sent from the AC high-voltage generating unit to the main controlling unit.

The main controlling unit detects the SC signal that addresses the abnormality, and turns OFF the PWM signal sent to the AC high-voltage generating unit.

In the configuration, even after turning the PWM signal OFF, the SC signal continues to output indicating an abnormality output from the AC high-voltage generating unit, while the output current is being turned OFF without being cancelled to recover until the power of the image forming apparatus is turned OFF/ON.

However, the technology explained with reference to FIG. 9 has following problems (1) to (3):

(1) The AC high-voltage output to be applied to the static charge eliminator is sensitive to a conductive substance attached to paper and to a momentary disturbance noise, leading to erroneously detect a previously-set over-current for the AC high-voltage output. Therefore, even a normal safe situation, an SC erroneous detection tends to occur.

(2) To reduce such an SC erroneous detection, if the over-current detection condition of the AC high-voltage output is simply eased by, for example, increasing the over-current detection value or the detection time of the AC high-voltage output, there is a possibility, for example, that smoking or ignition may occur when a user inadvertently sets a conductive paper sheet, such as a light-shield paper sheet for shielding a photosensitive member. In this case, safe operation cannot be guaranteed.

(3) When the AC high-voltage output meets the over-current detection condition, the AC high-voltage generating unit forcefully turns the AC high-voltage output OFF, and feeds an SC signal indicative of an abnormality back to the main controlling unit. The image forming apparatus then detects the SC. Then, the SC signal is continued to be in that state until the image forming apparatus is powered OFF/ON, and cannot be cancelled, which means a recovery cannot be operated. Therefore, even if a system reset of the image forming apparatus works, the SC signal cannot be cancelled. Thus, it disadvantageously takes time to recover.

SUMMARY OF THE INVENTION

It is an object of the present invention to at least partially solve the problems in the conventional technology.

According to an aspect of the present invention, an AC high-voltage device includes a transforming unit that transforms supplied power to an AC high-voltage; an over-current detecting unit that detects an over-current in the AC high-voltage; a main controlling unit that outputs a target value of the AC high-voltage; and a voltage controlling unit that includes a constant-voltage controlling unit that controls the AC transforming unit so that the AC transforming unit outputs the AC high-voltage targeted on the target value; and an turn-off unit that turns off the AC transforming unit so that the AC transforming unit stops outputting the AC high voltage, wherein when the over-current detecting unit does not detect the over-current, the constant-voltage controlling unit controls the AC transforming unit so that the AC transforming unit outputs the AC high-voltage targeted on the target value, for a period of time during which the over-current detecting unit detects the over-current, the turn-off unit turns off the AC transforming unit, and after the period, the constant-voltage controlling unit re-starts to control the AC transforming unit.

According to another aspect of the present invention, an image forming apparatus includes an image forming unit that forms a first toner image on a first image carrier due to electro-photography scheme; a transferring unit that transfers the first toner image onto a second image carrier due to a charge-bias scheme; an image-carrier separating unit that separates the second image carrier from the first image carrier after the second toner image is transferred by eliminating static charge from the second image carrier due to AC high-voltage discharging; and an AC high-voltage device that supplies an AC high voltage to the image-carrier separating unit for the AC high-voltage discharging, the AC high-voltage device including a transforming unit that transforms supplied power to an AC high-voltage; an over-current detecting unit that detects an over-current in the AC high-voltage; a main controlling unit that outputs a target value of the AC high-voltage; and a voltage controlling unit that includes a constant-voltage controlling unit that controls the AC transforming unit so that the AC transforming unit outputs the AC high-voltage targeted on the target value; and an turn-off unit that turns off the AC transforming unit so that the AC transforming unit stops outputting the AC high voltage, wherein when the over-current detecting unit does not detect the over-current, the constant-voltage controlling unit controls the AC transforming unit so that the AC transforming unit outputs the AC high-voltage targeted on the target value, for a period of time during which the over-current detecting unit detects the over-current, the turn-off unit turns off the AC transforming unit, and after the period, the constant-voltage controlling unit re-starts to control the AC transforming unit.

According to still another aspect of the present invention, a method of controlling an AC high-voltage device that transforms a supplied power to an AC high-voltage, the method includes generating a target value of high-voltage; transforming the supplied power to the AC high-voltage based on the target value; detecting whether there is an over-current in the AC high-voltage; controlling the transforming when no over-current is detected in the detecting; stopping the transforming when the over-current is detected for a period of time in the detecting; and re-starting the transforming after the period.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiment of a color copier is explained below as an image forming apparatus to which the present invention is applied.

Here, in the present embodiment, as an application example of a device that forms an image through electro-photography, the color copier is explained. The color copier forms a color image through a so-called tandem scheme by using four photosensitive drums of cyan (C), yellow (Y), magenta (M), and black (BK), carrying images of respective colors through optical writing and toner developing processes. The color copier transfers the color image onto an intermediate transfer belt as toner images from the photosensitive drums. Here, an AC high-voltage device is used in this color copier. For separating image carriers based on static charge elimination through AC high-voltage discharge, the AC high-voltage device is implemented as a unit that separates from the intermediate transfer belt a transfer paper, having received a transferred color image. However, this is not meant to be restrictive, and the embodiment can be applied to any component as long as the component requires static charge elimination due to AC high-voltage discharge.

Figure 1:
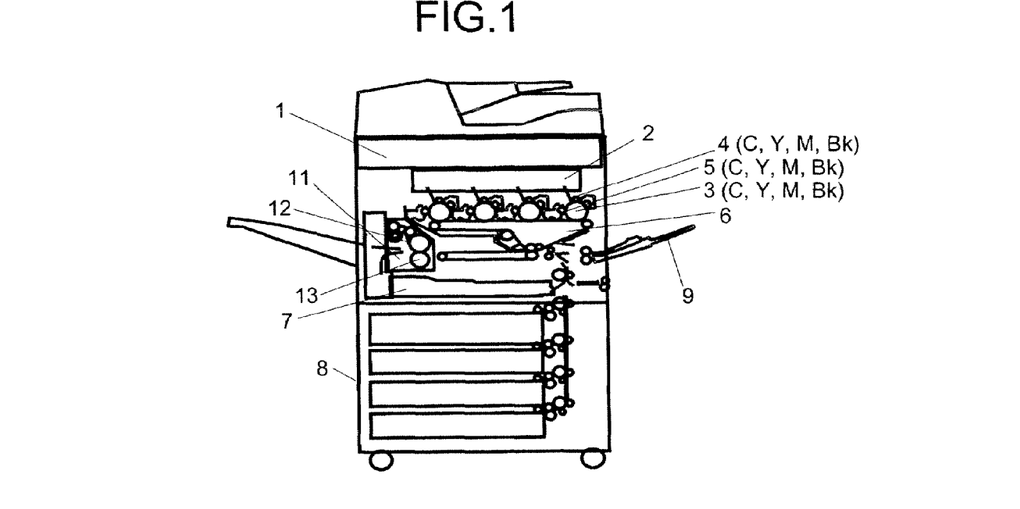
FIG. 1 is a schematic of a color copier including an AC high-voltage device according to an embodiment of the present invention.
Figure 2:
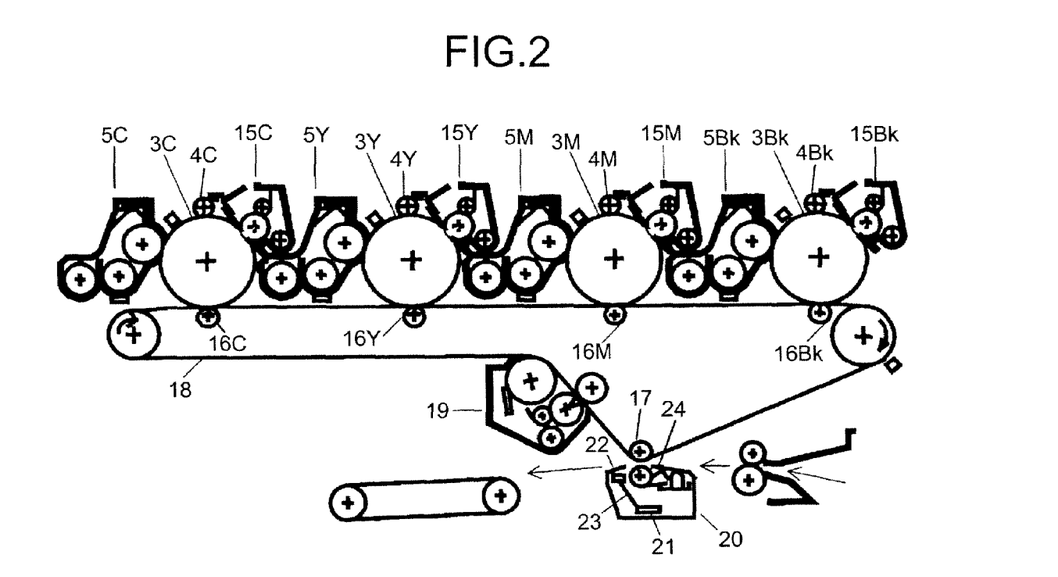
FIG. 2 is a view for explaining a tandem image forming engine shown in FIG. 1.

FIG. 1 is a schematic of a color copier including an AC high-voltage device according to an embodiment of the present invention. FIG. 2 is a view for explaining a tandem image forming engine shown in FIG. 1. Here, an image forming engine unit has a configuration, which is depicted in detail in FIG. 2.

The color copier depicted in FIG. 1 includes a scanner unit 1 that performs optical-electrical conversion on reflected light from an exposed document to be copied and performs signal processing on the read document image, a writing unit 2 that irradiates a photo-surface with beam light from a laser light source at which light emission is controlled through phase modulation (PM) or PWM by image data, photosensitive drums 3 each with its photo-surface irradiated with the laser beam from the writing unit 2 to form an electrostatic latent image. Also, around each photosensitive drum are a charging unit 4 that uniformly charges the photo-surface, and a developing unit 5 that attaches toner to the photosensitive drum 3 forming the latent image. Also, a transfer unit 6 is provided around the photosensitive drums for transferring the toner image attached to each photosensitive drum 3 to a transfer paper sheet, via an intermediate transfer belt. Here, since a tandem scheme is used, these developing and image forming processes around the photosensitive drums can be performed independently for each of the color components of cyan (C), yellow (Y), magenta (M), and black (BK). Also, in the course of transfer from each photosensitive drum 3 to the intermediate transfer belt, which is shown in FIG. 2, the respective color components are color-combined.

Furthermore, paper feeding trays are provided to a main body unit 7, that is one-side machine, and a paper feeding bank 8, and a manual paper feeding tray 9 is provided to the main body unit. Still further, a belt fixing unit 11 that apply heat and pressure to the transfer paper sheet with the formed image sent from a conveyor unit to fix toner on the paper sheet, a fixing roller 12, and a pressure roller 13 are provided.

A tandem image forming engines is shown in FIG. 2. A toner image for each color is formed on each of photosensitive drums 3C, 3Y, 3M, and 3BK for four color components. For this purpose, an image forming unit is provided around each of photosensitive drums 3C, 3Y, 3M, and 3BK, the image forming unit including, for example, a relevant one of charging units 4C, 4Y, 4M, and 4BK which uniformly charge a photo-surface before optical writing; a relevant one of developing units 5C, 5Y, 5M, and 5BK which use toner to develop an electrostatic latent image generated through optical writing; and a relevant one of cleaning units 15C, 15Y, 15M, and 15BK which clean non-transferred toner on the relevant photosensitive drum. Here, these image forming units are basically identical to one another except for the toner used.

In this example, a toner image formed on each photosensitive drum is once transferred to an intermediate transfer belt 18, which is a primary transfer, and then the images on the intermediate transfer belt 18 are further transferred to a transfer paper sheet, which is a secondary transfer. With such two transfers, an image is formed on the transfer paper sheet. Furthermore, image formation is performed with one paper passage. Therefore, images transferred on the intermediate transfer belt 18 via the photosensitive drums 3C, 3Y, 3M, and 3BK spaced a predetermined distance apart from upstream to downstream sides of the moving intermediate transfer belt 18 are superposed on the intermediate transfer belt 18 to be formed as a color image, and the color image is then transferred to the transfer paper sheet.

In more detail of the transfer process, the first transfer process is performed by applying a positive-polarity charge bias, which is opposite in polarity to each negative-polarity toner image, to each of primary transfer rollers 16C, 16Y, 16M, and 16BK, thereby drawing the toner images formed on the photosensitive drums 3C, 3Y, 3M, and 3BK from the inside of the intermediate transfer belt 18 for transfer onto the intermediate transfer belt 18.

The second transfer process is performed through a push bias scheme using a secondary transfer roller 24, secondary opposed transfer rollers 17, and the intermediate transfer belt 18. For the negative-polarity toner images transferred on the intermediate transfer belt, a negative-polarity bias, which has the same polarity as the toner, is applied to the secondary opposed transfer rollers 17, thereby transferring the toner images to the transfer paper sheet by pushing the toner from the inside of the intermediate transfer belt 18.

The transfer paper sheet after the second transfer is attached to the intermediate transfer belt 18. To separate them from each other, a discharge is caused to occur. Here, a static charge eliminator is used for discharge with a high AC. In the embodiment depicted in FIG. 2, a separation unit is configured with a static charge eliminator 22, an AC high-voltage generating unit 21 for applying an AC high-voltage output to the static charge eliminator 22, and a high-voltage harness unit 23 serving as an interface between the static charge eliminator 22 and the AC high-voltage generating unit 21, and these three units are integrally formed downstream of the transfer rollers in a secondary transfer unit 20.

Here, toner left on the intermediate transfer belt 18 as non-transferred toner is removed by a belt cleaning unit 19.

The control of the AC high-voltage generating unit 21 in the separation unit of the image forming apparatus described above is now explained.

The AC high-voltage generating unit 21 of the separating unit applies an AC high voltage to the static charge eliminator 22 so as to separate the transfer paper sheet and the intermediate transfer belt that are attached together due to the secondary transfer in a charge bias scheme. The AC high-voltage generating unit 21 is instructed by the main controlling unit of the image forming apparatus to apply a voltage with the Pk-Pk target voltage value to the static charge eliminator 22 allowing appropriate separation.

The AC high-voltage generating unit 21 performs a constant voltage control over supplied power at the instructed target voltage value for output. Also, the AC high-voltage generating unit 21 tries to detect the occurrence of an over-current in the AC high-voltage output, and if it detects the occurrence of such an over-current, it performs a control of turning the AC high-voltage output OFF to ensure safety.

Although such a control for turning the AC high-voltage output OFF has been performed in a former technology, a detection condition thereof is that a value approximately double a specification range of an output current is detected successively for approximately 200 milliseconds to 300 milliseconds, as shown in FIG. 9. This poses problems such that an SC erroneous detection tends to occur and there is a possibility that smoking or ignition may occur, as referred to (1) and (2) in Description of the Related Art.

To get around these problems, in the embodiment of the present invention, an intermittent output control is performed. The intermittent output control performed by the AC high-voltage generating unit 21, which is an AC high-voltage device, according to embodiment of the present invention is such that the output is turned OFF at the time of detecting the occurrence of an over-current in the AC high-voltage output under constant voltage control and, for example, after a predetermined OFF period shorter than 100 milliseconds, the control is again back to the constant voltage control for the intermittent output control. If the over-current continues even with the repetition of the operation of this intermittent output control for 500 milliseconds and the state does not get back to normal which does not lead an appropriate separation, the state is determined as an abnormal state requiring a procedure of recovering to a normal state, and the output is suspended as abnormality handling. However, if a cause of the occurrence of the abnormality is removed during 500 milliseconds and the state is recovered to normal, the constant voltage control operation continues.

With such an intermittent output control, smoking or ignition can be prevented from occurring even if an abnormal discharge continues, thereby ensuring safety. Furthermore, an intermittent output control can make a period for determining abnormality longer. This can prevent an SC erroneous detection due to momentary disturbance noise, thereby making it possible to continue longer normal operation.

Next, embodiments associated with the intermittent output control are explained.

Hereinafter, embodiments associated with the intermittent output control according to the embodiment of the present invention are explained. This explanation is divided into two, one for the AC high-voltage generating unit and the other for the main control unit, under sections of "Intermittent output control in the AC high-voltage generating unit" and "Abnormality handling in the main controlling unit", respectively.

In the "Intermittent output control in the AC high-voltage generating unit" section, mainly explained is the configuration of the control system of the AC high-voltage generating unit 21 for an intermittent output. In the "Abnormality handling in the main controlling unit" section, mainly explained is the configuration of the control system of a main controlling unit 30, to which the operation state due to the intermittent output control in the AC high-voltage generating unit 21 is fed back.

"Intermittent output control in the AC high-voltage generating unit"

Figure 3:
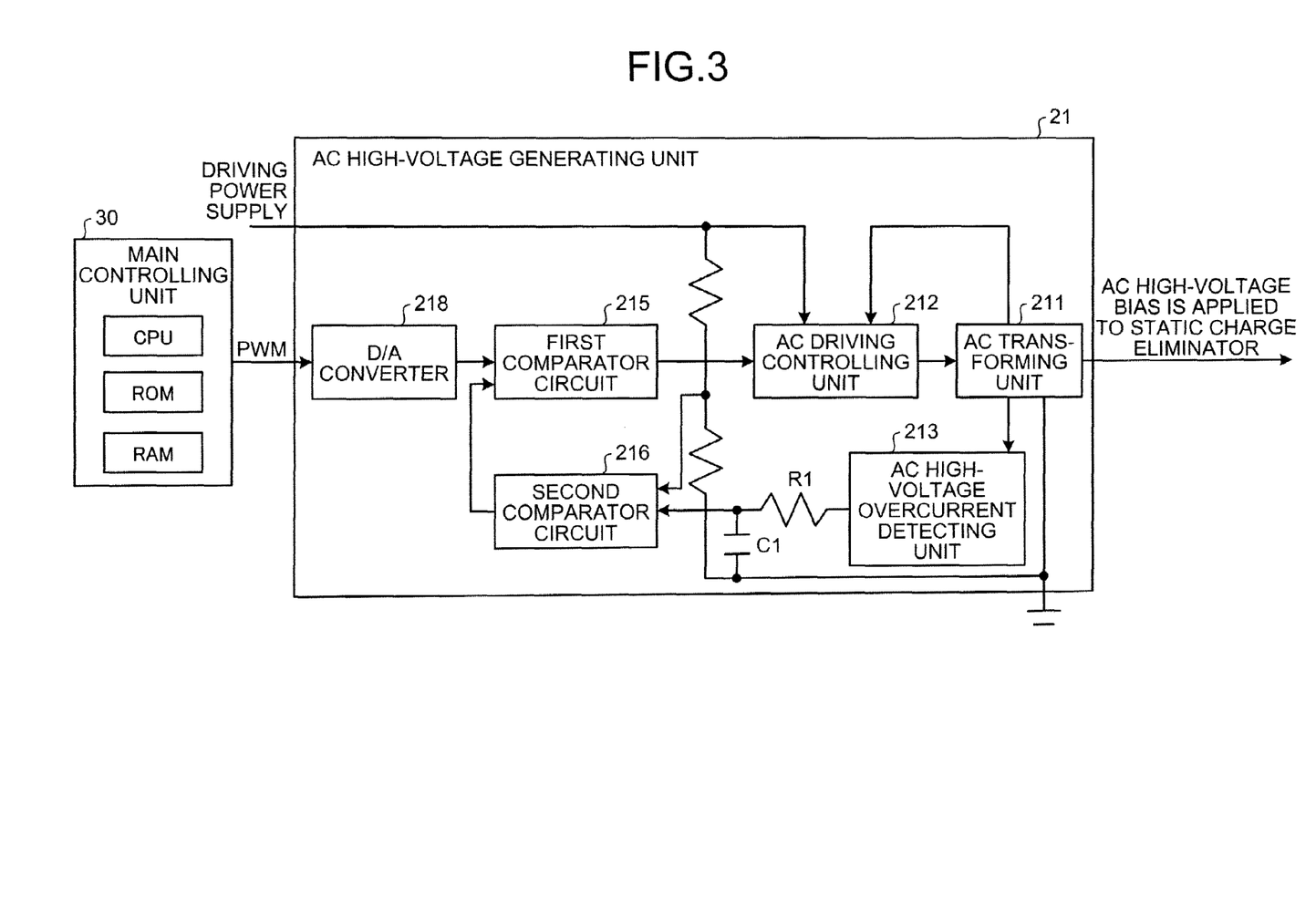
FIG. 3 is a block diagram of an AC high-voltage generating unit in the AC high-voltage device according to the embodiment.

FIG. 3 is a block diagram of an AC high-voltage generating unit in the AC high-voltage device according to the embodiment.

The AC high-voltage generating unit 21 applies a sinusoidal AC high-voltage bias at the Pk-Pk constant voltage to the static charge eliminator 22 to separate the transfer sheet paper and the intermediate transfer belt through discharge, thereby performing an intermittent output control over the over-current in the AC high-voltage output.

The main controlling unit 30 includes, for example, a central processing unit (CPU) that executes a computing function and other functions according to a program or data stored in a read-only memory (ROM), the ROM having stored therein necessary programs or data for controlling and managing the apparatus and other purposes, and a random-access memory (RAM) used as a work area for the CPU, and serves as a controller that controls the entire image forming apparatus.

In the present embodiment, the main controlling unit 30 indicates an applied voltage, Pk-Pk target voltage value, to the static charge eliminator 22 calculated in advance for appropriate separation to operate the AC high-voltage generating unit 21. The main controlling unit 30 transforms the indicated Pk-Pk target voltage value to a PWM signal for transmission to the AC high-voltage generating unit 21. In the AC high-voltage generating unit 21, a digital-to-analog (D/A) converter 218 analog-converts the PWM signal received from the main controlling unit, and then inputs the converted signal, which is an AC high-voltage output target reference voltage value, to a first comparator circuit 215.

In a normal state, the first comparator circuit 215 forwards the AC high-voltage output target reference voltage value to an AC driving controlling unit 212. Based on this voltage value, the AC driving controlling unit 212 performs a driving control over an AC transforming unit 211 that increases the supplied power so as to keep the AC high-voltage output at the Pk-Pk constant voltage, thereby applying an AC transformed output to the static charge eliminator 22.

The AC high-voltage output applied to the static charge eliminator 22 is generally a very large output with the Pk-Pk voltage of 8.0 kilovolts to 12.0 kilovolts. Therefore, for safety, an AC high-voltage over-current detecting unit 213 is provided to detect an excessive current flowing through the static charge eliminator 22 to which the AC high-voltage is output. This AC high-voltage over-current detecting unit 213 has set therein a predetermined over-current detection value for detecting a current of the AC high-voltage output flowing through the static charge eliminator 22 as an over-current.

When the AC high-voltage over-current detecting unit 213 detects that the current to the AC high-voltage output exceeds the previously-set over-current detection value at the time of an AC high-voltage output, information of detection is input to the first comparator circuit 215 via a second comparator circuit 216.

At this time, the second comparator circuit 216 compares the over-current detection information with a reference value, and then inputs a signal resulting from the comparison to the first comparator circuit 215. With this signal, turned OFF is the output of the first comparator circuit 215 is changed, and the AC high-voltage output target reference voltage value being forwarded to the AC driving controlling unit 212.

Therefore, with the operation of the first comparator circuit 215, the AC high-voltage output is forcefully suspended, thereby suspending AC high-voltage application to the static charge eliminator 22.

Then, since the application of the high-voltage output to the static charge eliminator 22 is suspended, in the AC high-voltage over-current detecting unit 213, the current becomes below the previously-set over-current detection value of the AC high-voltage output flowing through the static charge eliminator 22. Therefore, again through a constant voltage control with the AC high-voltage output target reference voltage value via the second comparator circuit 216 and the first comparator circuit 215, an AC high-voltage output is applied to the static charge eliminator. Here, an OFF period, during which application of the AC high-voltage output is suspended, is defined by a time constant of a condenser/resistor (CR) circuit provided between the AC high-voltage over-current detecting unit 213 and the second comparator circuit 216, that can be arbitrarily set by varying the time constant.

After the AC high-voltage output OFF period passes, being switched to a constant voltage control, and then again an over-current is detected to switch the AC high-voltage output to OFF. When the period in which the AC high-voltage output exceeds the over-current detection value continues, the output control operation of repeating OFF/ON of the AC high-voltage output continues over a period (hereinafter, "intermittent output control period"). In this state, the AC high voltage is applied to the static charge eliminator 22.

On the other hand, when the period in which an over-current is detected in the AC high-voltage output due to a transient cause, such as momentary disturbance noise, comes to an end and the state gets back to normal, after switching into a constant voltage control, the AC high-voltage output under the constant voltage control with the AC high-voltage output target reference voltage value, which is a voltage converted from the PWM signal received from the main controlling unit 30, is applied to the static charge eliminator 22.

As a result, during the period in which the AC high-voltage output exceeds the previously-set over-current detection value of the AC high-voltage output flowing through the static charge eliminator 22, applied is the AC high-voltage output under the intermittent output control to the static charge eliminator 22.

Figure 4:
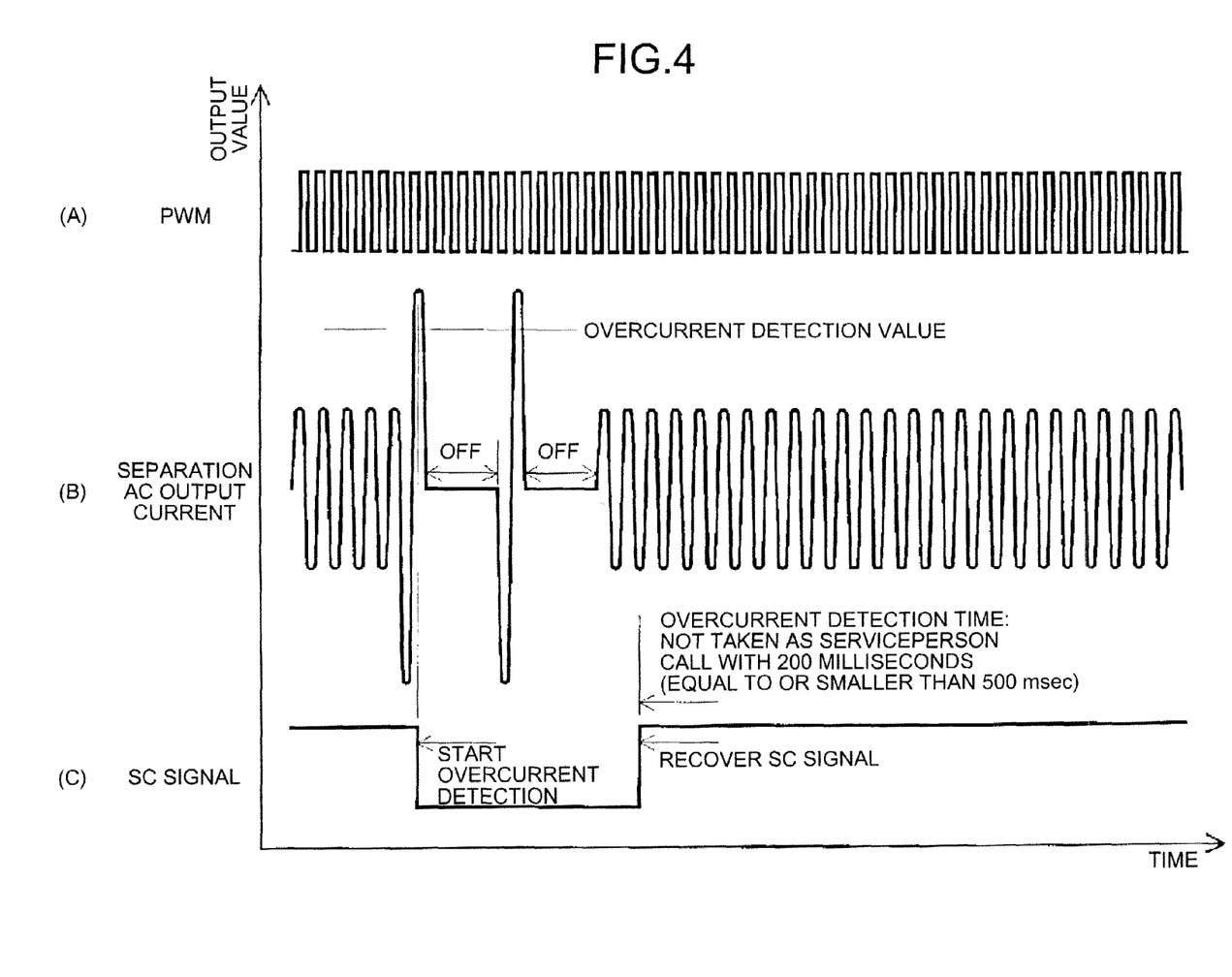
FIG. 4 is a signal line diagram for explaining an output operation of the AC high-voltage generating unit.

FIG. 4 is a signal line diagram for explaining an output operation of the AC high-voltage generating unit. In this diagram, the vertical axis represent an output value and the horizontal axis representing a time, a relation among three signals on the same time axis, that is, (A) a PWM signal, (B) an output current of the AC high-voltage output, and (C) the SC signal.

The PWM signal denoted as (A) in FIG. 4 has a PWM signal waveform representing, as a duty ratio, the Pk-Pk target voltage value of the previously-set AC high-voltage output from the main controlling unit 30 to the AC high-voltage generating unit 21 for application to the static charge eliminator. The output current value of the AC high-voltage output denoted as (B) in the drawing has a waveform obtained by voltage-transforming the output current value of the AC high-voltage output to be applied to the static charge eliminator 22.

As depicted in fluctuations in the output current of the AC high-voltage output of (B) in FIG. 4, the output is turned OFF during a predetermined period starting from the time when the AC high-voltage output applied to the static charge eliminator 22 exceeds the previously-set over-current detection value of the AC high-voltage output, and the AC high voltage applied to the static charge eliminator 22 is output intermittently.

The over-current detection value flowing through the static charge eliminator 22 is set with, for example, a pk value of 2.86 milliamperes. If the output exceeds this over-current detection value while a constant voltage control is performed with the target reference voltage value indicated by the PWM signal denoted as (A) in FIG. 4, the AC high-voltage output is turned OFF. Even if a switching is made to a constant voltage control after this OFF period, the output is turned OFF when an over-current is detected. Thus, the intermittent output control period in which OFF/ON is repeated continues until no over-current is detected.

As described, the intermittent output control is performed during a period in which the AC high-voltage output applied to the static charge eliminator 22 exceeds the previously-set over-current detection value of the AC high-voltage output. Therefore, in view of a long time range, reduced is an average power of the AC high-voltage output applied to the static charge eliminator 22. With this, in the image forming apparatus, even with the continuation of an abnormal discharge of the AC high-voltage output applied to static charge eliminator due to attachment of a conductive paper sheet, such as a light-shield paper sheet for shielding a photosensitive member, or a conductive substance, such as a static-eliminating brush, to the static charge eliminator, smoking or ignition can be prevented, thereby ensuring safety.

Also, as shown in FIG. 4, during the intermittent output control, if the cause of the over-current disappears to make the output below the over-current detection value and the state gets back to normal, referring to FIG. 4, an operation example is depicted in which the state gets back to normal after two OFF periods, a constant voltage control operation continues as it is, and the AC high-voltage output with the target reference voltage value based on the PWM signal is applied to the static charge eliminator. Therefore, the period in which an over-current is detected in the AC high-voltage output due to a transient cause, such as momentary disturbance noise, ends and the normal state is recovered.

Figure 5:
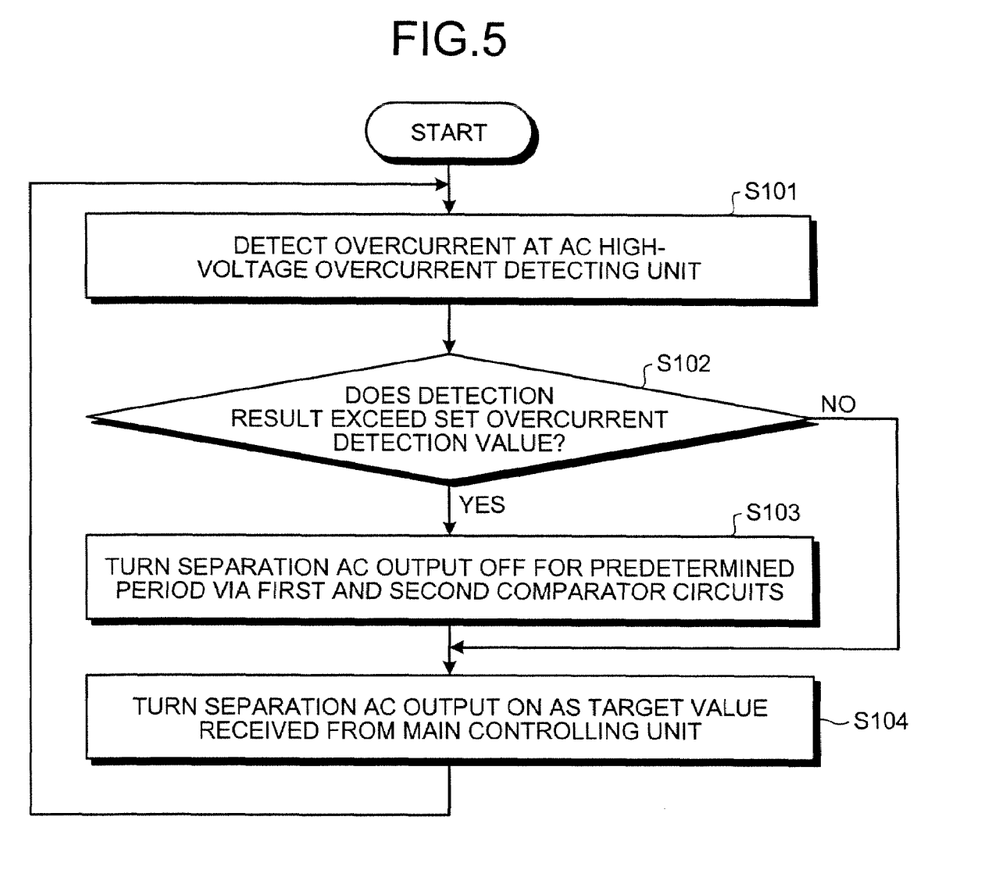
FIG. 5 is a flowchart explaining an intermittent output control in the embodiment.

FIG. 5 is a flowchart explaining an intermittent output control in the embodiment.

This control flow starts with the main controlling unit 30 of the image forming apparatus. When a PWM signal is transmitted from the main controlling unit 30 as a target reference voltage value, the AC high-voltage generating unit 21 drives the AC transforming unit 211 that increases supplied power, thereby performing an AC high-voltage output through a constant voltage control toward the target reference voltage value indicated by the PWM signal.

At the time of this AC high-voltage output controlling operation, the control flow depicted in FIG. 5 is performed at an appropriate timing.

In this control flow, the AC high-voltage over-current detecting unit 213 first detects whether the current of the AC high-voltage output exceeds the previously-set over-current detection value (step S101).

Here, if the detection result of an over-current is not obtained ("NO" at step S102), the operation is in a normal state. Therefore, the constant voltage control toward the target reference voltage value, the value indicated by the PWM signal, received from the main controlling unit 30 continues to output to the static charge eliminator 22 an AC high voltage for separating the transfer paper sheet and the intermediate transfer belt 18 from each other through discharge (step S104). Then the procedure returns to the sequence starting with over-current detection (step S101).

On the other hand, if the detection result of an over-current is obtained ("YES" at step S102), an over-current detection signal is input to the first comparator circuit 215 via the second comparator circuit 216 to change the output of the first comparator circuit 215, thereby turning OFF the AC high-voltage output target reference voltage value, which has been forwarded to the AC driving controlling unit 212, for a predetermined period to turn the AC high-voltage output OFF (step S103). After a lapse of this period, the AC high-voltage output target reference voltage value forwarded to the AC driving controlling unit 212 is turned ON (step S104). During the period, a switching is made to an intermittent output control in which the AC high-voltage output is turned OFF/ON. After the AC high-voltage output is turned ON, the procedure returns to the sequence starting with current detection (step S101).

"Abnormality Handling in the Main Controlling Unit"

Hereinafter, mainly explained is the configuration of the control system of the main controlling unit 30, in which information indicative of the operation state of the intermittent output control in the AC high-voltage generating unit 21 is fed back.

In the AC high-voltage generating unit 21, as explained in the "Intermittent output control in the AC high-voltage generating unit" section above, the output operation is switched to an intermittent output control on condition of the occurrence of an over-current in the AC high-voltage output. With this control, a failure, such as smoking or ignition, that might occur due to an over-current is prevented, thereby making safer. Furthermore, with respect to a transient cause of an over-current, the possibility of recovery to the normal operation increases. However, for a cause of the over-current not allowing recovery to the normal operation, some repair is required. Therefore, in the control system, a measure is required in which a switching is made at the time of occurrence of an over-current to an intermittent output control, an abnormality is determined when this control operation continues for a predetermined time, making it possible to recover the abnormality needed based on this determination. The main controlling unit 30 includes functions for achieving such a measure as a control system.

Here, such functions are incorporated as follows. That is, abnormality handling is performed, which is associated with suspension control, such as output OFF of the control target value of the AC high-voltage output, which is PWM signal, and reporting of abnormality, required at the main controlling unit 30 based on the information indicative of the operation state of the intermittent output control fed back from the AC high-voltage generating unit 21. With this handling, an appropriate operation of the apparatus is ensured. Furthermore, by interlocking the detection of the occurrence of an abnormality with a system reset of the main controlling unit, it is possible to work without problems in the operation at the time of recovery from the abnormality.

Figure 6:
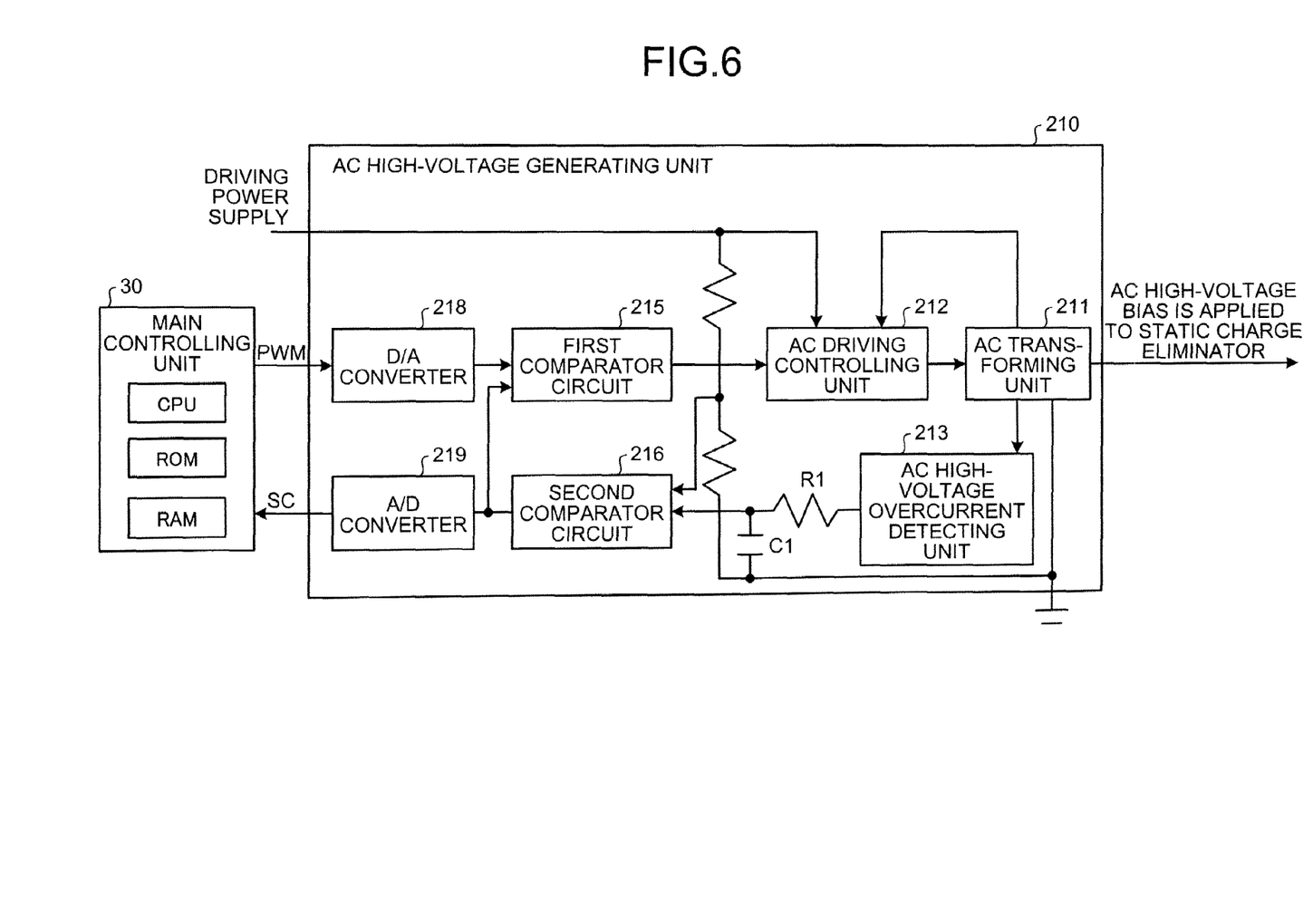
FIG. 6 is another block diagram of the an AC high-voltage generating unit according to the embodiment.

FIG. 6 is another block diagram of the an AC high-voltage generating unit according to the embodiment.

The AC high-voltage generating unit 210 depicted in FIG. 6 having a configuration similar to that depicted in FIG. 3, but differs to in that feeding back the information indicative of the operation state under the intermittent output control to the main controlling unit 30, which is an output information from the second comparator circuit 216 provided at an output side of the AC high-voltage over-current detecting unit 213, that is fed back to the main controlling unit 30 as an SC signal via an analog-to-digital (A/D) converter 219, which is, output destinations from the second comparator circuit 216 are both of the first comparator circuit 215 and the main controlling unit.

With the feedback circuit being configured in a manner as described above, the information indicative of a change in state of the over-current in the AC high-voltage output indicated by the output from the second comparator circuit 216 can be received as a digital SC signal by the main controlling unit 30 in synchronization with the detection of the over-current by the AC high-voltage generating unit 210. The configuration of the AC high-voltage generating unit 210 other than this feedback circuit is similar to the configuration depicted in FIG. 3, therefore described is not the description previously made to the configuration depicted in FIG. 3 is referred to.

Also, the SC signal is sent as information allowing the main controlling unit 30 receiving this signal to recognize the SC signal as a signal indicative of an intermittent output control period starting with the detection of an over-current in the AC high-voltage output. That is, based on the output from the second comparator circuit 216, the A/D converter 219 of the AC high-voltage generating unit 210 depicted in FIG. 6 allocates the following information to a High-level signal and a Low-level signal of digital SC signals.

That is, the High-level signal contains information indicating that the AC high-voltage output does not exceed the previously-set over-current detection value of the AC high-voltage output and an AC high voltage with the AC high-voltage output target reference voltage value, which is PWM signal, indicated by the main controlling unit 30 is output, whilst the Low-level signal contains information indicating that the AC high-voltage output exceeds the previously-set over-current detection value of the AC high-voltage output and an AC high voltage under an intermittent output control is output.

Here, the output from the second comparator circuit 216 is a periodic signal since the over-current detection signal of the AC high-voltage output detected by the AC high-voltage over-current detecting unit 213 is turned ON/OFF periodically under the intermittent control. Therefore, to make a Low-level signal that follows the intermittent output control period, the A/D converter 219 functions as such.

With reference to FIG. 4 explaining above, the signal line diagram for explaining the operation associated with the AC high-voltage output during the intermittent output control period, the SC signal in (C) of the drawing is the signal according to the operation explained above.

In the operation example depicted in FIG. 4, as depicted in a change in the AC high-voltage output in (B) of the drawing, the intermittent output control of turning the output OFF for a predetermined period starts when the AC high-voltage output applied to the static charge eliminator 22 exceeds the previously-set over-current detection value of the AC high-voltage output.

Therefore, at this time, the A/D converter 219 switches the SC signal, which has been at a High level while the AC high voltage with the AC high-voltage output target reference voltage value, which is PWM signal, indicated by the main controlling unit 30 was normally output and which is to be fed back to the main controlling unit 30, to a Low level.

Then, the state becomes such that the AC high voltage applied to the static charge eliminator 22 is intermittently output due to the intermittent output control. In the example depicted in the drawing, after two cycles of the output OFF period, the cause of the over-current disappears, and the control returns normally, without detection of an over-current, to the constant voltage control toward the AC high-voltage output target reference voltage value, which is PWM signal. At the time of recovery of the normal operation, the A/D converter 219 switches the SC signal, which is at a Low level and is to be fed back to the main controlling unit 30, to a High level.

The main controlling unit 30 receiving the SC signal detects an occurrence of an abnormality, at the main controlling unit 30 side, based on the information indicative of an intermittent output control period fed back by the SC signal.

Even if the SC signal indicative of the intermittent output control period is sent, there may be one case where recovery to the normal operation is possible, referring to the operation example of FIG. 4, and another case where such recovery is not possible, referring to an operation example of FIG. 7 which will be explained further below. Therefore, it is required to determine whether a recovery is possible and whether a repair is required. For this purpose, a predetermined time period is set, and determined is whether the intermittent output control period continues for the set time period or not. If it continues, it is determined that an abnormality occurs, and is detected as such.

In one embodiment, detection of the occurrence of the abnormality is made based on the detection condition that the SC signal indicative of the intermittent output control period continues for the previously-set time period. For example, when the SC signal is checked at each predetermined sampling period, and if an SC signal, low-level signal shown in FIG. 4, indicative of the intermittent output control period is continuously present, a previously-created table in which a relation of the occurrence of an abnormality with respect to the continued time is defined is referred to for the obtained continued time. From the reference results, the presence or absence of the occurrence of an abnormality is determined. This process of detecting the occurrence of an abnormality can be achieved as software by the CPU driving a process program for abnormality handling prepared at the main controlling unit 30.

Also, the detection of the occurrence of an abnormality may have different abnormality-occurrence detection conditions due to the configuration of the image forming unit of the apparatus or transfer conditions, such that the transfer paper sheet is a conductive paper sheet or a light-shield paper sheet for shielding a photosensitive member, or may have abnormal discharge of the AC high-voltage output applied to the static charge eliminator tends to occur due to a conductive substance, such as a static-eliminating brush being attached to the static charge eliminator. Therefore, various tables used in detection are prepared so as to correspond to detection condition variations. Also, the condition is set by software in the main controlling unit 30 according to the transfer condition. With this, an optimum detection is performed.

Next, an example is explained in which a continued time of the SC signal indicative of the intermittent output control period, which is taken as a detection condition of the occurrence of an abnormality, is set as 500 milliseconds.

Through the intermittent output control, as explained in the "Intermittent output control in the AC high-voltage generating unit" section above, safety is ensured against an over-current, which is an abnormal discharge, of the AC high-voltage output during the control period. Therefore, even with a long SC signal setting time, there is no problem in safety. Thus, compared with the case where 200 milliseconds is set as a detection condition of the occurrence of an abnormality in the related art, refer to FIG. 9, the setting time is taken longer, thereby making it possible to reduce erroneous detection when an over-current occurs due to a momentary cause and the state can be recovered to normal by increasing the setting time.

However, if the continued time of the SC signal set as a detection condition is taken too long, in the case where the state cannot be recovered to normal, an over-current continues, and the state cannot get back to normal, which means appropriate separation cannot be achieved, thereby wasting time. For this reason, the continued time of the SC signal as a detection condition is desirably set at an appropriate value. Herein, an example is depicted in which 500 milliseconds is set as an experientially-obtained appropriate value.

Figure 7:
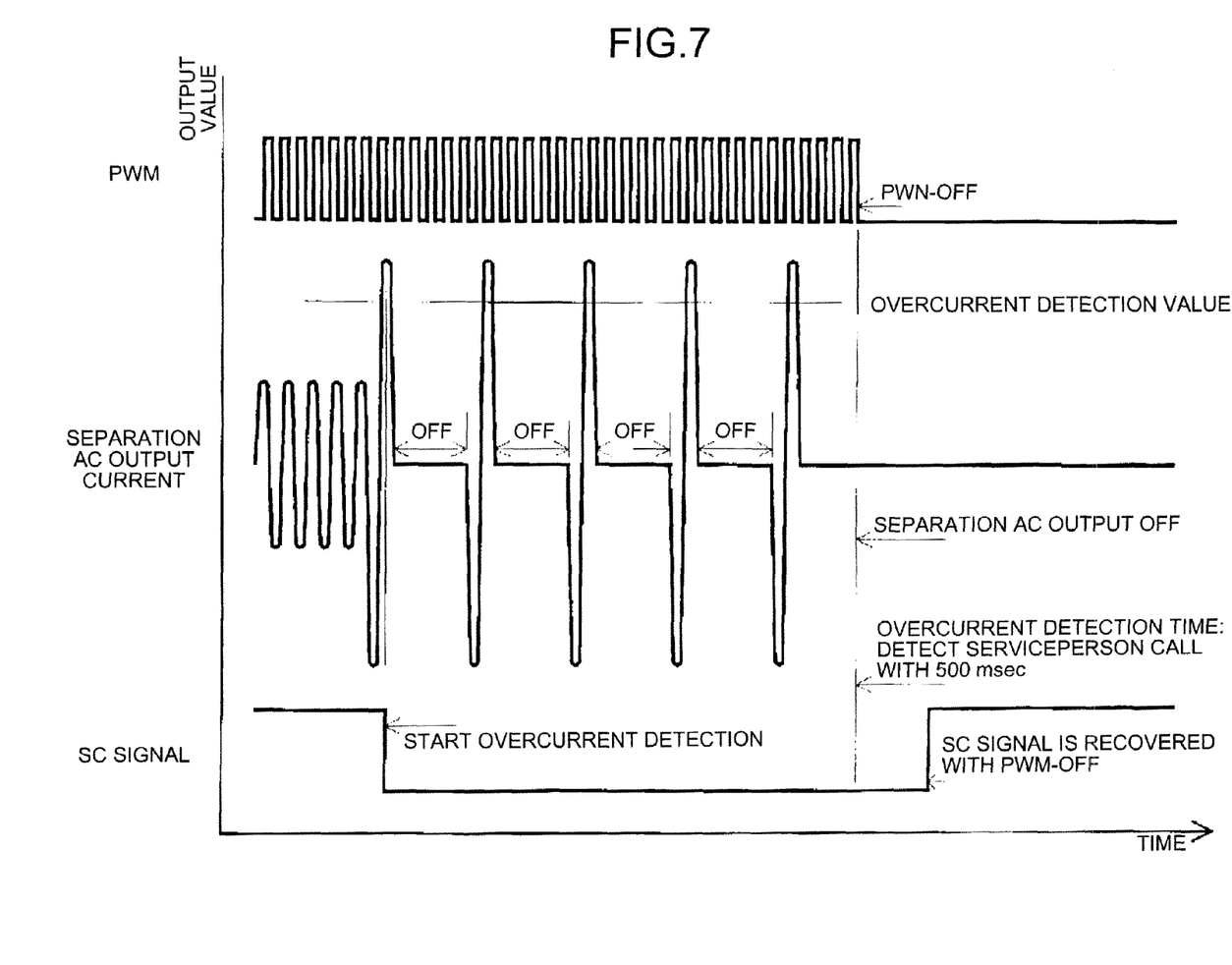
FIG. 7 is another signal line diagram for explaining an output operation of the AC high-voltage generating unit.

FIG. 7 is another signal line diagram for explaining an output operation of the AC high-voltage generating unit. In this drawing, with the vertical axis representing an output value and the horizontal axis representing a time, a relation among three signals on the same time axis, that is, (A) a PWM signal, (B) an output current of an AC high-voltage output, and (C) an SC signal, is depicted.

The PWM signal denoted as (A) in FIG. 7 has a PWM signal waveform representing, as a duty ratio, the Pk-Pk target voltage value of the previously-set AC high-voltage output from the main controlling unit 30 to the AC high-voltage generating unit 210 for application to the static charge eliminator. The output current value of the AC high-voltage output denoted as (B) in the drawing has a waveform obtained by voltage-transforming the output current value of the AC high-voltage output to be applied to the static charge eliminator 22.

In the operation example depicted in FIG. 7, as depicted in a change in the AC high-voltage output in (B) of the drawing, the intermittent output control of turning the output OFF for a predetermined period starts when the AC high-voltage output applied to the static charge eliminator 22 exceeds the previously-set over-current detection value of the AC high-voltage output.

Therefore, at this point in time, the A/D converter 219 switches the SC signal, which has been at a High level while the AC high voltage with the AC high-voltage output target reference voltage value, PWM signal, indicated by the main controlling unit 30 was normally output and which is to be fed back to the main controlling unit 30, to a Low level.

Then, the state becomes such that the AC high voltage applied to the static charge eliminator 22 is intermittently output due to the intermittent output control. In the example depicted in the drawing, in the course of a fifth cycle of the output OFF period, the continued time after the intermittent output control period starts has reached 500 milliseconds, which is previously set as a detection condition. Thus, at this point in time, an abnormality is detected. When an abnormality is detected in a manner explained above, the main controlling unit 30 performs processing at the time of occurrence of an abnormality, which will be explained below.

When an abnormality is detected according to the abnormality detection condition, the main controlling unit 30 performs such processing at the time of occurrence of an abnormality as follows.

One of the processing at the time of occurrence of an abnormality is to report the occurrence of an abnormality to the user, or an operator). In this case, as a detection condition at the time of detecting an abnormality, a long time is set, such as 500 millisecond shown in the embodiment above, which is longer than that of the related art. Therefore, an erroneous detection due to a momentary cause can be reduced. Thus, it is often the case that the detected abnormality requires repair by a serviceperson or the like. Therefore, when the occurrence of an abnormality (SC) is detected, a message is displayed on a display unit provided on an operation panel of the image forming apparatus, indicating that an abnormality occurs in the separation unit in the secondary transferring unit 20, thereby reporting the occurrence of an abnormality to the user, or the operator.

As an embodiment of implementing the process of reporting the occurrence of an abnormality, when the main controlling unit 30 detects an abnormality as explained above based on the SC signal, low-level signal, sent from the AC high-voltage generating unit 210 indicative of the intermittent output control period, based on the detected abnormality, a table previously created as an error table defining a relation between types of abnormality and error messages to be displayed is referred to. As a result of referring to the table, settings required for controlling display of a relevant error message are performed, and then a message display is performed.

The process of displaying an error message at the time of occurrence of an abnormality can be achieved as software by the CPU driving a process program for abnormality handling prepared at the main controlling unit 30.

Another one of the processing at the time of occurrence of an abnormality is to perform control of turning the output of the AC high-voltage generating unit 210 OFF.

After the main controlling unit 30 detects an abnormality based on the SC signal indicative of the intermittent output control period and sent from the AC high-voltage generating unit 210, it is meaningless to operate the AC high-voltage generating unit 210 that is performing outputs under the intermittent output control, which means appropriate separation cannot be obtained from intermittent outputs. Therefore, the output is immediately turned OFF.

One embodiment for implementing the process of turning the output from the AC high-voltage generating unit 210 OFF is to suspend the output of the PWM signal, which the signal indicative of the previously-set Pk-Pk target voltage value of the AC high-voltage output for application to the static charge eliminator, transmitted from the main controlling unit 30 to the AC high-voltage generating unit 210.

With reference to FIG. 7 explained above, which is a signal line diagram for explaining the operation associated with the AC high-voltage output under the intermittent output control, the occurrence of an abnormality (SC) is detected when 500 milliseconds of the intermittent output period set in the SC signal in (C) of the drawing as a detection condition of the occurrence of an abnormality has elapsed.

As depicted in the operation example of FIG. 7, after the detection of the occurrence of an abnormality, the output of the PWM signal is suspended, as shown in a change in the PWM signal in (A) of the drawing.

Therefore, the control of turning the output of the PWM signal OFF can be performed as follows.

That is, when the main controlling unit 30 detects an abnormality in a manner explained above based on the SC signal (Low-level signal) indicative of the intermittent output control period and sent from the AC high-voltage generating unit 210, based on the detected abnormality in the AC high-voltage output in the AC high-voltage generating unit 210, a table previously created as an error table defining a relation between types of abnormality and abnormality handling is referred to. As a result of referring to the table, as relevant error handling, an instruction is made for turning OFF the output of the PWM signal to the AC high-voltage generating unit 210. According to this instruction, settings required for the OFF control of the PWM signal output, and then this control is performed.

The process associated with the OFF control of the PWM signal output at the time of occurrence of an abnormality can be achieved as software by the CPU driving a process program for abnormality handling prepared at the main controlling unit 30.

An embodiment explained next is aimed at eliminating problems that has been occurring at the time of recovery to the normal operation after the output OFF control of the AC high-voltage generating unit 210.

In the above, the output OFF control of the AC high-voltage generating unit 210 is performed as a process of handling the abnormality detected based on the SC signal indicative of the intermittent output control period.

Although an intermittent output control has not been performed, the OFF control of the AC high-voltage output is performed based on the detection of an over-current in the AC high-voltage output, and at the time of detecting the over-current, the AC high-voltage generating unit changes the SC signal from a High level, at which the SC signal has been, to a Low level for transmission to the main controlling unit as a signal indicative of the output state (refer to FIG. 9). However, after the SC signal is changed to a Low level, the AC high-voltage output is suspended at the AC high-voltage generating unit. Also, transmission of the PWM signal provided from the main controlling unit to the AC high-voltage generating unit is suspended. Furthermore, even after the control of suspending these outputs, the SC signal at a Low level is kept at a Low level, and is not recovered to a High level, as depicted in the operation example of the related art in FIG. 9, after turning the PWM signal in (A) of the drawing OFF, the SC signal in (C) of the drawing is not recovered to a High level.

Therefore, even with a system reset to cancel the SC, the SC signal from the AC high-voltage generating unit is not recovered to a High level. Therefore, a problem occurs that the image forming apparatus cannot operate normally. Here, in the related art, to recover the SC signal to a High level, power OFF/ON is required. In the case where a system reset can repair a problem due to an over-current occurring in the AC high-voltage output, an inconvenience of turning power ON/OFF is required, thereby decreasing the performance of the apparatus.

To get around this problem, in the present embodiment, when the output of the PWM signal, the signal indicative of the previously-set Pk-Pk target voltage value of the AC high-voltage output for application to the static charge eliminator, transmitted from the main controlling unit 30 to the AC high-voltage generating unit 210 is turned OFF, the AC high-voltage generating unit 210 side changes, from a Low level to a High level, the SC signal indicative of the intermittent output control period, which is according to the over-current in the AC high-voltage output, thereby recovering the feedback signal to normal, the feedback signal being returned to the main controlling unit 30.

With reference to FIG. 7 explained above, which is a signal line diagram for explaining the operation associated with the AC high-voltage output under the intermittent output control, the occurrence of an abnormality (SC) is detected when 500 milliseconds of the intermittent output period set in the SC signal in (C) of the drawing as a detection condition of the occurrence of an abnormality has elapsed. At this time, the output of the PWM signal is immediately suspended, as shown in a change in the PWM signal in (A) of the drawing.

Also, after the output of the PWM signal is turned OFF, as shown by the SC signal in (C) of FIG. 7, the SC signal indicative of the intermittent output control period as a Low level is changed to a High level, thereby recovering the signal to a signal indicative of a normal operation state.

Assuming that the SC signal output from the AC high-voltage generating unit 210 is recovered to a signal indicative of a normal operation state after an output suspension control of turning OFF the output of the PWM signal to be transmitted from the main controlling unit 30 to the AC high-voltage generating unit 210, the image forming apparatus with its operation being suspended through the output suspension control can be operated again by a system reset.

However, if the system reset is automatically performed, the abnormality handling operation is repeated unless some restrictions are imposed. Therefore, if the abnormality handling is performed twice and then again an abnormality occurs, a possibility to return to the normal operation state is extremely low even with further repetitions of the handling. Thus, it is appropriate to perform the system reset only once. That is, a detection condition of the occurrence of an abnormality set in the main controlling unit 30 is such that a Low level is detected only once in consecutive 500 milliseconds. Under this condition, the system reset is caused by the main controlling unit 30, thereby canceling the SC, making it possible to operate the image forming apparatus, and solving the inconvenience in the related art requiring power OFF/ON. Also, in the present embodiment, the abnormality handling is performed twice, which is as meaningful as the case in which the detection time of the occurrence of an abnormality is increased, thereby further reducing erroneous detection.

Figure 8:
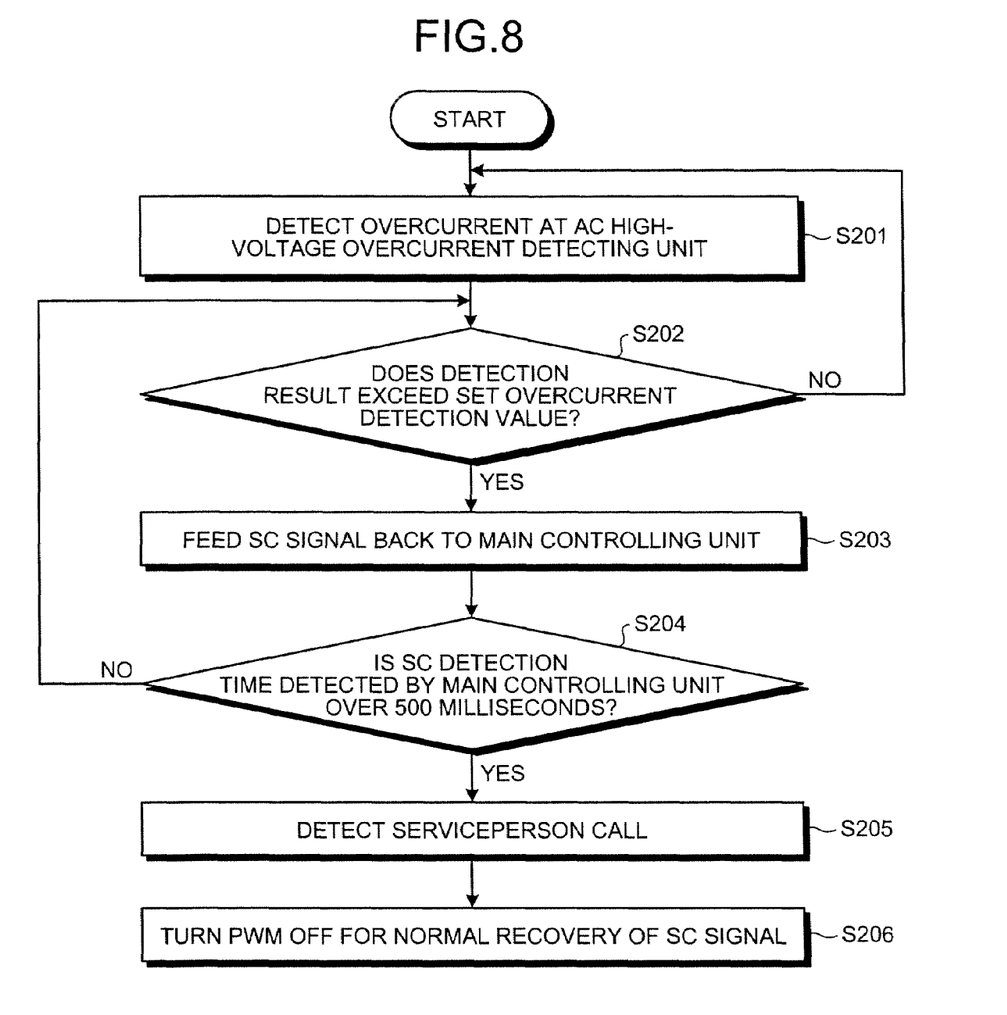
FIG. 8 is another flowchart explaining an intermittent output control in the embodiment.

FIG. 8 is another flowchart explaining an intermittent output control in the embodiment. This control flow is started by the main controlling unit 30 of the image forming apparatus, and is associated with abnormality handling performed at the main controlling unit 30 based on the SC signal fed back from the AC high-voltage generating unit 210 during the intermittent output control period correspondingly to an over-current occurring in the output of the AC high-voltage output from the AC high-voltage generating unit 210 outputs an AC high voltage. Here, the intermittent output control performed at the AC high-voltage generating unit 210 is as depicted in the embodiment explained above, which is shown in the control flow of FIG. 5, and is therefore omitted in the control flow of FIG. 8.

When a PWM signal is transmitted from the main controlling unit 30 as a target reference voltage value, the AC high-voltage generating unit 210 drives the AC transforming unit 2101 that increases supplied power, thereby performing an AC high-voltage output through the constant voltage control toward the target reference voltage value indicated by the PWM signal.

At the time of this operation of controlling the AC high-voltage output, the control flow depicted in FIG. 8 is performed at an appropriate timing.

In this control flow, it is first detected by the AC high-voltage over-current detecting unit 213 whether the current of the AC high-voltage output exceeds the previously-set over-current detection value or not (step S201).

Here, the procedure cannot go to the next step until the current exceeds the over-current detection value. If the current does not exceed the over-current detection value ("NO" at step S202), the procedure returns to step S201 for detecting a next over-current.

On the other hand, if the current exceeds the over-current detection value ("YES" at step S202), an over-current detection signal is input to the A/D converter 219 via the second comparator circuit 216. Then, an SC signal that is low-level signal indicative of the intermittent output control period is fed back from the A/D converter 219 to the main controlling unit 30 (step S203).

Next, the main controlling unit 30 receiving the SC signal fed back from the AC high-voltage generating unit 210 detects, based on the SC signal, whether an abnormality occurs in the AC high-voltage output or not, with the SC signal continuing for 500 milliseconds as an abnormality detection condition (step S204).

Here, if the SC signal does not continue for 500 milliseconds, the occurring over-current has come to an end ("NO" at step S204). Therefore, an SC signal that is low-level signal that is fed back next is waited, and it is then detected whether an abnormality is present in the incoming SC signal.

On the other hand, if the SC signal continues for 500 milliseconds ("YES" at step S204), the occurrence of an abnormality (SC) is detected (step S205). Then, an abnormality handling corresponding to the type of the detected occurrence of the abnormality (SC) is obtained by referring to the table.

Here, the abnormality is due to an over-current occurring in the output of the AC high-voltage generating unit 210. Therefore, the abnormality handling obtained by referring to the error table defining a relation between the type of abnormality and abnormality handling is to turn OFF the output of the PWM signal to the AC high-voltage generating unit 210 and to recover the SC signal to normal.

Therefore, according to this abnormality handling, the main controlling unit 30 performs control of turning the output of the PWM signal to the AC high-voltage generating unit 210. Also, according to the fact that the PWM signal is turned OFF, the AC high-voltage generating unit 210 performs control of recovering the SC signal at a Low level to normal at a High level (step S206).

In this manner, according to the present embodiments, an intermittent output control is performed, in which the output is turned OFF during predetermined period when the occurrence of an over-current is detected in the AC high-voltage output under a constant voltage control and then the control is returned again to the constant voltage control. With this, even an abnormal discharge continues, smoking or ignition can be prevented, thereby ensuring safety. Furthermore, with such an intermittent output control, a period for determining the necessity of abnormality handling (SC) can be increased. With this, SC erroneous detection due to a momentary disturbance noise or the like can be avoided, thereby making it possible to continue the normal operation.

Still further, the main controlling unit receiving a feedback signal indicative of an intermittent output control period detects the occurrence of an abnormality on condition that the feedback signal indicative of the intermittent output control period continuously for a predetermined period is detected. With this, such an abnormal handling as turning OFF the output with the control target value of the AC high-voltage output and reporting the abnormality can be performed by the main controlling unit, thereby ensuring an appropriate operation of the apparatus. Still further, a system reset of the main controlling unit is performed on condition that the occurrence of an abnormality is detected only once to allow the control to start. With this, a quick recovery can be made.

Still further, in an image forming apparatus having an image-carrier separating unit that eliminates static charge through an AC high-voltage discharge, the AC high-voltage device according to the embodiment is used as an AC high-voltage device that applies an AC high voltage for static charge elimination, in particular, as an AC high-voltage device for applying an AC high voltage to a static charge eliminator that separates the transfer paper sheet from the intermediate transfer belt. Thus, in the image forming apparatus, abnormal suspension control is optimized. Also, the effects of the AC high-voltage device according to the embodiment of the present invention achieving both safety and use efficiency can be attained. Furthermore, the performance of the image forming apparatus can be increased.

Further effects and variations can be easily introduced by those skilled in the art. Thus, wider-ranging embodiments according to the present invention are not meant to be restricted to the specific details and representative embodiments depicted and explained herein. Therefore, various modifications can be made without departing from the sprit and scope of the present invention defined by the attached claims and their equivalents.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An AC high-voltage device comprising:
   an AC-transforming unit that transforms supplied power to an AC high-voltage;
   an over-current detecting unit that detects an over-current in the AC high-voltage;
   a constant voltage controlling unit that outputs a target value of the AC high-voltage;
   a turn-off/on unit that,
   when the over-current detecting unit detects the over-current, makes the constant voltage controlling unit stop AC-transforming by the AC-transforming unit for a first predetermined period, and
   when the first predetermined period passes, makes the constant voltage controlling unit re-start the AC-transforming by the AC-transforming unit;
   an intermittent signal outputting unit that outputs, when the turn-off/on unit repeats stopping and re-starting of the AC-transforming as an intermittent control, an intermittent control signal indicating a continuing of the intermittent control;
   a main controlling unit that
   determines whether the intermittent control signal continues to be output during a second predetermined period which is longer than the first predetermined period, and
   when it has been determined that the intermittent control signal continues for the second predetermined period, stops the AC-transforming unit due to an abnormality.

2. The AC high-voltage device according to claim 1, further comprising:
   a resetting unit that resets the constant voltage controlling unit to an initial state when there is a single occurrence of an abnormality in a predetermined period.

3. An image forming apparatus comprising:
   an image forming unit that forms a first toner image on a first image carrier due to electro-photography scheme;
   a transferring unit that transfers the first toner image onto a second image carrier due to a charge-bias scheme;
   an image-carrier separating unit that separates the second image carrier from the first image carrier after the second toner image is transferred by eliminating static charge from the second image carrier due to AC high-voltage discharging; and
   an AC high-voltage device that supplies an AC high voltage to the image-carrier separating unit for the AC high-voltage discharging, the AC high-voltage device including
   an AC-transforming unit that transforms supplied power to an AC high-voltage;

an over-current detecting unit that detects an over-current in the AC high-voltage;

a constant voltage controlling unit that outputs a target value of the AC high-voltage;

a turn-off/on unit that, when the over-current detecting unit detects the over-current, makes the constant voltage controlling unit stop AC-transforming by the AC-transforming unit for a first predetermined period, and when the first predetermined period passes, makes the constant voltage controlling unit re-start the AC-transforming by the AC-transforming unit;

an intermittent signal outputting unit that outputs, when the turn-off/on unit repeats stopping and re-starting of the AC-transforming as an intermittent control, an intermittent control signal indicating a continuing of the intermittent control;

a main controlling unit that determines whether the intermittent control signal continues to be output during a second predetermined period which is longer than the first predetermined period, and when it has been determined that the intermittent control signal continues for the second predetermined period, stops the AC-transforming unit due to an abnormality.

4. A method of controlling an AC high-voltage device that transforms a supplied power to an AC high-voltage, the method comprising:

generating a target value of high-voltage;

transforming the supplied power to the AC high-voltage based on the target value;

detecting whether there is an over-current in the AC high-voltage;

controlling the transforming when no over-current is detected in the detecting;

stopping the transforming when the over-current is detected for a first predetermined period of time; and re-starting the transforming after the first predetermined period;

outputting an intermittent control signal indicating a continuing of intermittent control when the AC-transforming to the high voltage is stopped and restarted;

determining whether the intermittent control signal continues to be output during a second predetermined period which is longer than the first predetermined period; and stopping the transforming when the intermittent control signal continues for the second predetermined period.

5. The AC high-voltage device according to claim 1, wherein the main controlling unit sends information indicating an occurrence of the abnormality to a user or an operator, when it has been determined that the abnormality occurs.

* * * * *